(12) United States Patent  (10) Patent No.: US 7,878,154 B2
Ferworn et al.  (45) Date of Patent: Feb. 1, 2011

(54) REMOTE PARCEL DEPLOYMENT SYSTEM (75) Inventors: Alexander Ferworn, Toronto (CA);
Devin James Ostrom, Toronto (CA);
Kevin Terrence Barnum, Toronto (CA)

(73) Assignee: Ryerson University, Ontario (CA)

( * ) Notice: Subject to any disclaimer, the term of this patent is extended or adjusted under 35 U.S.C. 154(b) by 13 days.

(21) Appl. No.: 12/292,227

(22) Filed: Nov. 14, 2008

(65) Prior Publication Data

US 2009/0165430 A1    Jul. 2, 2009

Related U.S. Application Data (60) Provisional application No. 60/988,839, filed on Nov. 19, 2007.

(51) Int. Cl.
*A62B 35/00* (2006.01)
(52) U.S. Cl. .................................................... 119/772
(58) Field of Classification Search ......... 119/769–772, 119/774, 776–778, 792, 856, 859
See application file for complete search history.

(56) References Cited

U.S. PATENT DOCUMENTS

| | | |
|---|---|---|
| D313,677 S | 1/1991 | Hammon et al. |
| 5,184,762 A | 2/1993 | Nevitt |
| D372,564 S | 8/1996 | Casey |
| 5,560,321 A | 10/1996 | Hess |
| 5,644,902 A | 7/1997 | Kemp |
| 5,815,895 A | 10/1998 | Carlson et al. |
| 5,887,772 A | 3/1999 | Dooley |
| D419,271 S | 1/2000 | Camino et al. |
| D429,390 S | 8/2000 | Grady et al. |
| D429,391 S | 8/2000 | Grady et al. |
| 6,314,915 B1 | 11/2001 | Pope et al. |
| 6,571,745 B2 | 6/2003 | Kerrigan |
| D480,843 S | 10/2003 | Sullivan |
| 2003/0025792 A1 | 2/2003 | Eberhard |
| 2007/0204803 A1 | 9/2007 | Ramsay |
| 2007/0262111 A1 | 11/2007 | Cooper-Banks |
| 2008/0054040 A1 | 3/2008 | Tanaka |

*Primary Examiner*—Thomas Price
(74) *Attorney, Agent, or Firm*—Clark & Brody (57) ABSTRACT

A reusable parcel harness for securing a parcel to a dog's chest generally includes at least one pin bar having first and second mounting pins extending therefrom towards a latch housing, a spring-loaded latch to releasably secure the pin bar to the latch housing or pin bar in a closed configuration, a latch release mechanism, and a harness attached to the latch housing to secure the apparatus on a dog. The spring-loaded latch biases the pin bar and the latch housing towards an open configuration. A latch release processor actuates the latch release mechanism upon receipt of a locally or remotely generated latch release signal. A parcel to be secured to the harness includes a parcel body and straps extending from opposing sides of the parcel body. Each strap terminates in a mounting loop that can be secured about a mounting pin on the harness.

22 Claims, 8 Drawing Sheets

REMOTE PARCEL DEPLOYMENT SYSTEM

CROSS REFERENCE TO RELATED APPLICATIONS

This application claims priority to U.S. Provisional Patent Application Ser. No. 60/988,839, filed Nov. 19, 2007, the entire contents of which are incorporated herein by reference.

FIELD

The specification relates to use of a dog to deliver parcels, for example a parcel of food and water delivered to a casualty during a search-and-rescue operation. In particular, the specification relates to a reusable system that permits a dog to carry a parcel snugly against its chest.

BACKGROUND

Dogs can be used to carry or deliver objects, such as food, water, and medicine. This may be accomplished, for example, by attaching one or more packs to the dog's back or sides, or to a collar around the dog's neck. For example, U.S. Pat. No. 5,644,902 discloses an apparatus that maintains a load for a dog to carry. U.S. Pat. No. 5,644,902 teaches that the load is centrally located on the front and top of the dog's back.

It is known that dogs need mobility and balance for climbing or running during such operations. Moreover, search-and-rescue operations sometimes often require the dog to negotiate obstacles in order to reach a casualty. A shortcoming of many existing carry apparatuses is that they permit "play" between the parcel and the dog. That is, the parcel may move as the dog moves, potentially interfering with the dog's mobility and balance as the dog runs or climbs. In addition, the parcel may become damaged by or snagged on obstacles that the dog must negotiate to reach the casualty.

SUMMARY

Disclosed herein are various embodiments of an apparatus for securing one or more parcels to a dog's chest. According to an aspect of an embodiment, the apparatus generally includes: a latch housing; a pin bar having a first end and a second end and including a first mounting pin extending from the first end towards the latch housing and a second parcel mounting pin extending from the second end towards the latch housing; a spring-loaded latch to releasably secure the pin bar to the latch housing in a closed configuration, wherein the spring-loaded latch is biased towards an open configuration; and a latch release mechanism. The apparatus optionally includes a harness attached to at least one of the latch housing and the pin bar that is configured to permit the apparatus to be secured about a dog. The apparatus typically further includes a latch release processor operably coupled to the latch release mechanism and configured to actuate the latch release mechanism upon receipt of a latch release signal.

In some embodiments, a wireless receiver may be operably coupled to the latch release processor and configured to receive the latch release signal from a wireless transmitter. In some embodiments, the apparatus optionally further includes a microphone operably coupled to the latch release processor and configured to receive an audible latch release signal, such as sustained barking. It is contemplated that the microphone may operate in a failover mode.

In some embodiments, the apparatus includes at least one signal light attached to at least one of the pin bar and the latch housing. In some embodiments, the apparatus includes a first signal light attached to a left side of at least one of the pin bar and the latch housing and a second signal light attached to a right side of at least one of the pin bar and the latch housing. The first and second signal lights may be of different colors.

A parcel according to an aspect of an embodiment generally includes: a parcel body having a first side and a second side; a first strap extending from the first side of the parcel body and terminating in a first mounting loop; and a second strap extending from the second side of the parcel body and terminating in a second mounting loop. Typically, the first and second mounting loops will be configured to be secured about the first and second parcel mounting pins, respectively.

In another aspect of an embodiment, provided is a system that permits a dog to carry a parcel securely against its chest. The system generally includes a parcel harness configured to wrap around a dog's torso and including a parcel mount and a parcel.

In some embodiments, the parcel mount generally includes: a pin bar having a first end and a second end and including a first parcel mounting pin extending from the first end and a second parcel mounting pin extending from the second end; a latch housing; a latch to releasably secure the pin bar to the latch housing in a closed configuration, wherein the first and second parcel mounting pins are positioned adjacent the latch housing; a spring connected to the pin bar and the latch housing, wherein the spring biases the pin bar and the latch housing in an open configuration, wherein the first and second parcel mounting pins are spaced apart from the latch housing; a latch release mechanism; and a latch release processor operably coupled to the latch release mechanism and configured to actuate the latch release mechanism upon receipt of a latch release signal.

In some embodiments, the parcel generally includes: a parcel body having a first side and a second side; a first strap extending from the first side of the parcel body and terminating in a first parcel mounting loop, wherein the first parcel mounting loop is configured to be secured about the first parcel mounting pin; and a second strap extending from the second side of the parcel body and terminating in a second parcel mounting loop, wherein the second parcel mounting loop is configured to be secured about the second parcel mounting pin. The first parcel mounting loop and the second parcel mounting loop may be carabiners.

In some embodiments, the system a may also include a wireless transmitter configured to send the latch release signal. The parcel mount may correspondingly include a wireless receiver operably coupled to the latch release processor and configured to receive the latch release signal sent by the wireless transmitter. In some embodiments, the parcel mount also includes a microphone operably coupled to the latch release processor and configured to receive an audible latch release signal. The microphone may operate to receive the audible latch release signal only when communication between the wireless transmitter and the wireless receiver is impossible (e.g., failure of the wireless receiver and/or an out-of-range condition between the wireless receiver and wireless transmitter). Alternatively, the microphone may operate to receive the audible latch release signal only when signal integrity between the wireless transmitter and the wireless receiver drops below a preset threshold. In still other embodiments, it is contemplated that the latch release signal may only be an audible release signal (e.g., sustained barking by the dog), without any remotely-transmitted signal.

In some embodiments, a length of at least one of the first strap and the second strap is adjustable to permit the parcel body to be snugly secured against the dog's torso. In some embodiments, a length of both of the first strap and the second strap is adjustable to permit the parcel body to be snugly secured against the dog's chest.

According to an aspect of an embodiment, provided is a method of enabling a dog to deliver a parcel. The method includes the step of providing a parcel harness configured to wrap around a dog's torso and including a parcel mount, which generally includes: a pin bar having a first end and a second end and including a first parcel mounting pin extending from the first end and a second parcel mounting pin extending from the second end; a latch housing; a spring-loaded latch to releasably secure the pin bar to the latch housing in a closed configuration, wherein the first and second parcel mounting pins are positioned adjacent the latch housing, a spring force of the spring-loaded latch biasing the pin bar and the latch housing towards an open configuration, wherein the first and second parcel mounting pins are spaced apart from the latch housing; and a latch release mechanism. The parcel harness is attached to a dog such that the parcel mount is located on the dog's back, and the pin bar is latched to the latch housing in the closed configuration. A parcel having a parcel body, a first strap terminating in a first parcel mounting loop extending from a first side of the parcel body, and a second strap terminating in a second parcel mounting loop extending from a second side of the parcel body is then provided. The first parcel mounting loop is attached to the first parcel mounting pin and the second parcel mounting loop is attached to the second parcel mounting pin such that the parcel body is located under the dog's torso. It is also desirable to adjust the parcel such that the parcel body is snugly secured against the dog's chest.

Once the dog locates a casualty, a remote signal to actuate the latch release mechanism can be transmitted, thereby releasing the pin bar and the latch housing into the open configuration and dropping the parcel from under the dog's torso. Alternatively, a signal to actuate the latch release mechanism may be locally received, for example detecting sustained barking by the dog using a microphone included in the parcel mount, thereby releasing the pin bar and the latch housing into the open configuration and dropping the parcel from under the dog's torso.

According to an aspect of an embodiment, provided is an apparatus for securing at least one parcel to a dog's chest, the apparatus comprising, a latch housing; at least one pin bar having a first end and a second end and including a first mounting pin extending from the first end towards the latch housing and a second parcel mounting pin extending from the second end towards the latch housing; a spring-loaded latch to releasably secure the at least one pin bar to the latch housing in a closed configuration, wherein the spring-loaded latch is biased towards an open configuration; and a latch release mechanism.

According to another aspect of an embodiment, provided is a system permitting a dog to carry a parcel securely against its chest, the system comprising:

a parcel harness configured to wrap around a dog's torso and including a parcel mount, the parcel mount comprising:

at least one pin bar having a first end and a second end and including a first parcel mounting pin extending from the first end and a second parcel mounting pin extending from the second end;

a latch housing;

a latch to releasably secure the at least one pin bar to the latch housing in a closed configuration, wherein the first and second parcel mounting pins are positioned adjacent the latch housing;

a spring connected to the at least one pin bar and the latch housing, wherein the spring biases the at least one pin bar and the latch housing in an open configuration, wherein the first and second parcel mounting pins are spaced apart from the latch housing;

a latch release mechanism; and a latch release processor operably coupled to the latch release mechanism and configured to actuate the latch release mechanism upon receipt of a latch release signal; and a parcel, comprising:

a parcel body having a first side and a second side;

a first strap extending from the first side of the parcel body and terminating in a first parcel mounting loop, wherein the first parcel mounting loop is configured to be secured about the first parcel mounting pin; and a second strap extending from the second side of the parcel body and terminating in a second parcel mounting loop, wherein the second parcel mounting loop is configured to be secured about the second parcel mounting pin.

According to a further aspect of an embodiment, provided is a method of enabling a dog to deliver a parcel, the method comprising:

providing a parcel harness configured to wrap around a dog's torso and including a parcel mount, the parcel mount comprising:

at least one pin bar having a first end and a second end and including a first parcel mounting pin extending from the first end and a second parcel mounting pin extending from the second end;

a latch housing;

a spring-loaded latch to releasably secure the at least one pin bar to the latch housing in a closed configuration, wherein the first and second parcel mounting pins are positioned adjacent the latch housing, a spring force of the spring-loaded latch biasing the at least one pin bar and the latch housing towards an open configuration, wherein the first and second parcel mounting pins are spaced apart from the latch housing; and a latch release mechanism;

attaching the parcel harness to a dog such that the parcel mount is located on the dog's back;

latching the at least one pin bar to the latch housing in the closed configuration;

providing a parcel having a parcel body, a first strap terminating in a first parcel mounting loop extending from a first side of the parcel body, and a second strap terminating in a second parcel mounting loop extending from a second side of the parcel body; and attaching the first parcel mounting loop to the first parcel mounting pin and the second parcel mounting loop to the second parcel mounting pin such that the parcel body is located under the dog's torso.

An advantage is that the parcel is snugly secured against the dog's chest, inhibiting it from moving independent of the dog, and thereby preserving the dog's mobility, balance, and ability to negotiate obstacles.

Another advantage is that the parcel is protected from damage by the dog's legs.

Yet another advantage is that the parcel can be remotely and accurately deployed.

Still another advantage is that the system can be manually reset and reused.

The foregoing and other aspects, features, details, utilities, and advantages will be apparent from reading the following description and claims, and from reviewing the accompanying drawings.

DETAILED DESCRIPTION OF THE EMBODIMENTS

Figure 1:
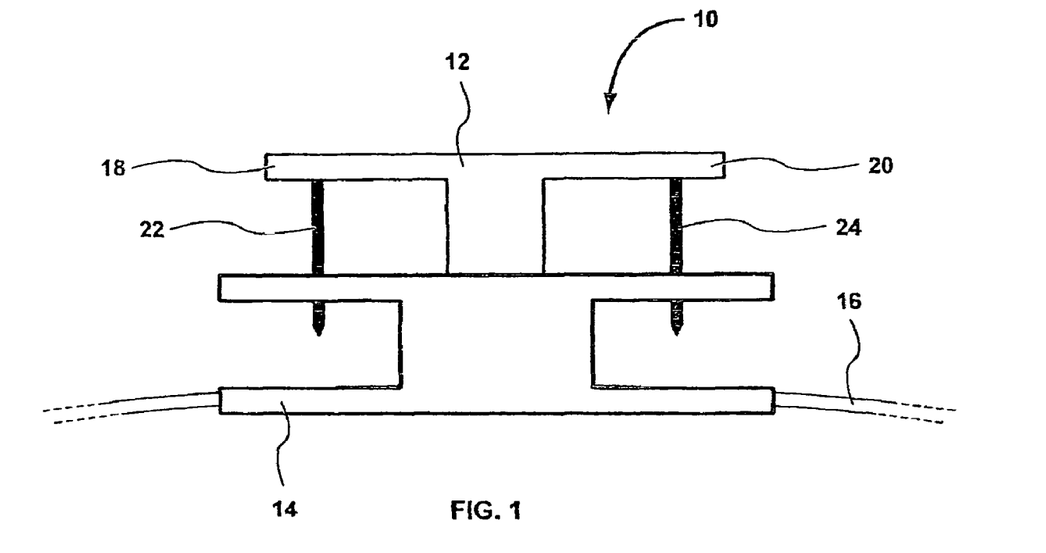
FIG. 1 illustrates a parcel harness according to an embodiment, the parcel harness shown in an open configuration.

A parcel harness 10 for securing a parcel to a dog's chest according to an embodiment is shown in FIG. 1. Parcel harness 10 generally includes a pin bar 12, a latch housing 14, and a harness 16. The term "parcel mount" will be used herein to refer to those components of parcel harness 10 exclusive of harness 16 itself (specifically including pin bar 12 and latch housing 14).

Pin bar 12 has a first end 18 and a second end 20, which is generally opposite first end 18. A first mounting pin 22 extends from first end 18 towards latch housing 14, while a second mounting pin 24 extends from second end 20 towards latch housing 14. It should be understood that, pin bar 12 can take any shape, such as rectangular, square, circular, oblong, or the like.

Latch housing 14 provides a sealed environment for any electronic and mechanical components of the parcel mount. These components may include, without limitation, and as further discussed below, a wireless receiver, a microphone, a latch release processor, a power supply (e.g., a rechargeable or user replaceable battery), and a mechanical, electrical, or electro-mechanical latch and latch release mechanism. Latch housing 14 may also be ergonomically configured for placement on a dog (e.g., curved to substantially conform to the dog's body or padded for the dog's comfort).

Figure 2:
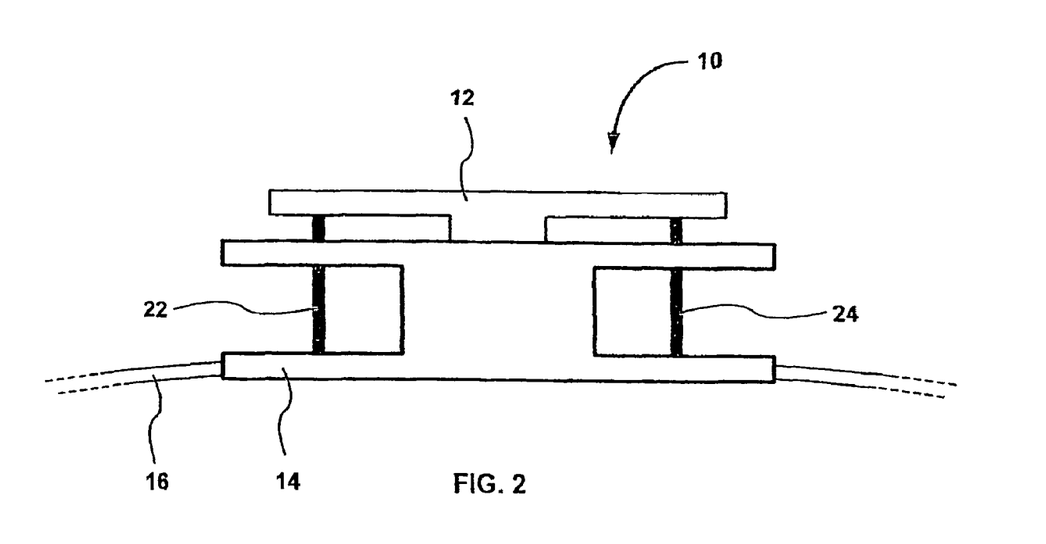
FIG. 2 depicts a parcel harness according to an embodiment, the parcel harness shown in a closed configuration.

FIG. 1 illustrates the parcel mount in an open configuration, wherein first mounting pin 22 and second mounting pin 24 are spaced apart from latch housing 14. FIG. 2 illustrates the parcel mount in a closed configuration, wherein first mounting pin 22 and second mounting pin 24 are positioned adjacent latch housing 14. In the closed configuration, the terminal ends of first and second mounting pins 22, 24 may extend into recesses in latch housing 14, may abut latch housing 14, or may simply be sufficiently close to latch housing 14 to inhibit passage of a parcel mounting loop (described in further detail below) between first and second mounting pins 22, 24 and latch housing 14.

To releasably secure the parcel mount in the closed configuration, parcel harness 10 further includes a spring-loaded latch, which, in the embodiment illustrated in FIGS. 1 and 2, is internal to latch housing 14. The spring-loaded latch includes a spring (also internal to latch housing 14 in the embodiment illustrated) that biases pin bar 12 and latch housing 14 towards the open configuration.

Parcel harness 10 also includes a latch release mechanism, which, in the embodiment illustrated in FIGS. 1 and 2, is internal to latch housing 14. The restorative forces generated in the spring in the closed configuration illustrated in FIG. 2 cause parcel harness 10 to return to the open configuration illustrated in FIG. 1 when the latch release mechanism is actuated. Collectively, the latch and the latch release mechanism may be a simple mechanical mechanism, an electromechanical mechanism (e.g., a motor that drives a set of gears, which in turn pushes a mechanical lever that releases the latch), or any other suitable mechanism.

Harness 16 is attached to latch housing 14 and is configured to permit parcel harness 10 to be secured about a dog in any suitable fashion. In one embodiment, parcel harness 10 is secured about the dog with the parcel mount positioned on the dog's back. Harness 16 may be of fixed size or of adjustable size to accommodate different body types of different dogs.

Parcel harness 10 may also include a latch release processor (internal to latch housing 14 in the embodiment illustrated) operably coupled to the latch release mechanism. The latch release processor is configured to actuate the latch release mechanism, thereby returning the parcel mount to the open configuration, upon receipt of a latch release signal. The term "processor" as used herein refers to one or more computer microprocessors and/or software programs (e.g., software modules or separate programs) that are designed to be executed by one or more microprocessors running on one or more computer systems. The term "processor" also encompasses hardware-based solutions (e.g., a series of instructions stored in one or more solid-state devices).

Figure 3:
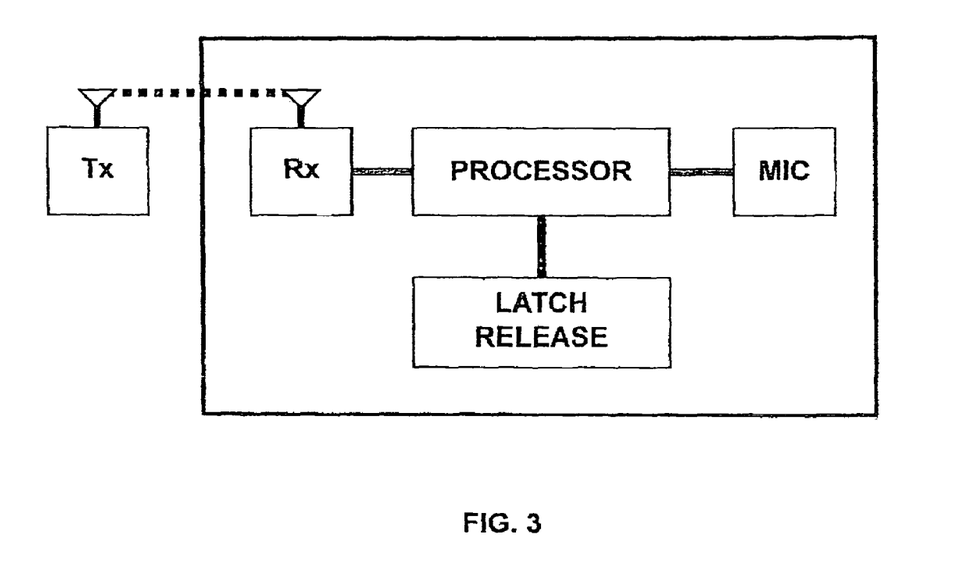
FIG. 3 schematically illustrates a remotely and locally actuable system for deploying a parcel carried by a dog.

As shown in the block diagram of FIG. 3, since it is desirable to actuate the latch release mechanism remotely, parcel harness 10 may also include a wireless receiver operably coupled to the latch release processor. The wireless receiver is configured to receive the latch release signal from a wireless transmitter, which may be carried by the search-and-rescue dog handler or other individual responsible or requiring the actuation of the latch release mechanism. Upon receipt of a proper signal from the wireless transmitter, the latch release processor will actuate the latch release mechanism to open the parcel mount.

The wireless transmitter and wireless receiver can be paired on a one-to-one basis (e.g., each wireless transmitter controls only a single parcel harness), on a many-to-one basis (e.g., each wireless transmitter can control multiple parcel harnesses or each parcel harness can be controlled by many wireless transmitters), or on a many-to-many basis (e.g., each of several wireless transmitters can control several parcel harnesses).

Search-and-rescue dogs are trained to bark continuously upon locating a casualty. Such barking may alert the dog's handler to use the wireless transmitter to send the latch release signal. One of ordinary skill will appreciate, however, that, during an operation, the dog may move out of range of the handler's wireless transmitter, or there may be obstacles blocking the signal from the handler's wireless transmitter. Accordingly, contemplated is the ability to actuate the latch release mechanism upon a locally-received audible signal, and some embodiments include a microphone operably coupled to the latch release processor. The microphone is configured to receive an audible latch release signal, such as the sustained barking that will take place when the search-and-rescue dog locates a casualty. The processor may be configured to initiate a timer upon recognition of sustained barking, after which the parcel is dropped.

It is contemplated that the microphone may operate in a failover or failsafe mode. That is, the microphone may activate in the event that circumstances make it difficult or impossible to remotely actuate the latch release mechanism. For example, the microphone may activate if the wireless receiver fails, if the wireless receiver moves out of range of the wireless transmitter, or if the strength/integrity of the signal between the wireless transmitter and the wireless receiver degrades below a preset threshold. Alternatively, the microphone may operate continuously, such that the latch release signal may be received either from the wireless transmitter through the wireless receiver or from the microphone. In still other embodiments, for example where radiofrequency transmission is undesirable, only a microphone may be provided.

The parcel mount may also include at least one signal light, such as one or more high-intensity LEDs. These signal lights may assist the dog's handler in locating the dog and may further provide feedback to the handler that the system is functioning correctly (e.g., by blinking according to a preset interval). In some embodiments, the parcel mount includes a first signal light of a first color attached to a first side of the parcel mount and a second signal light of a second color attached to a second side of the parcel mount. This arrangement permits the handler to identify which direction the dog is facing, much as opposing green and red signal lights permit observers to identify which direction an aircraft or seagoing vessel is facing.

Figure 4A:
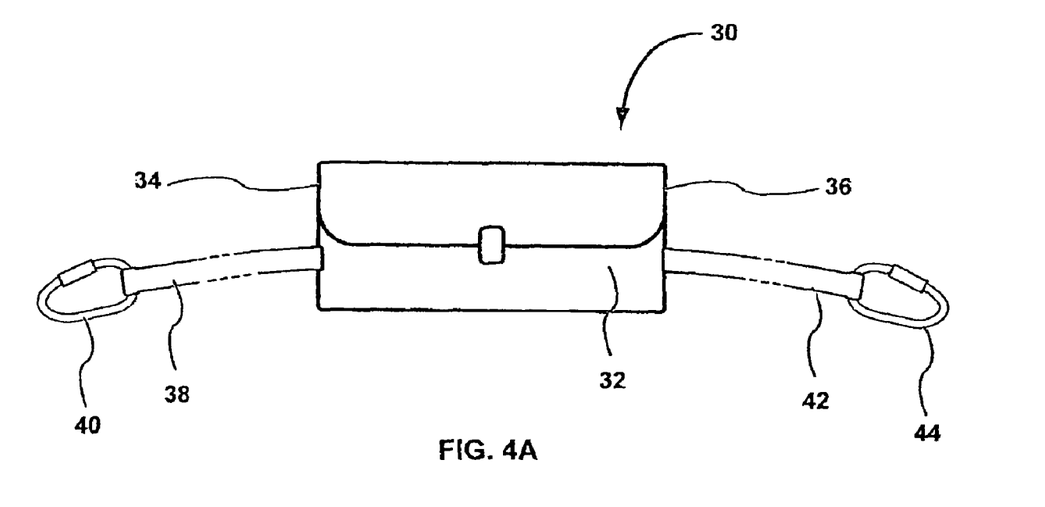
FIGS. 4A and 4B illustrate exemplary parcels for use with the parcel harness.
Figure 4B:
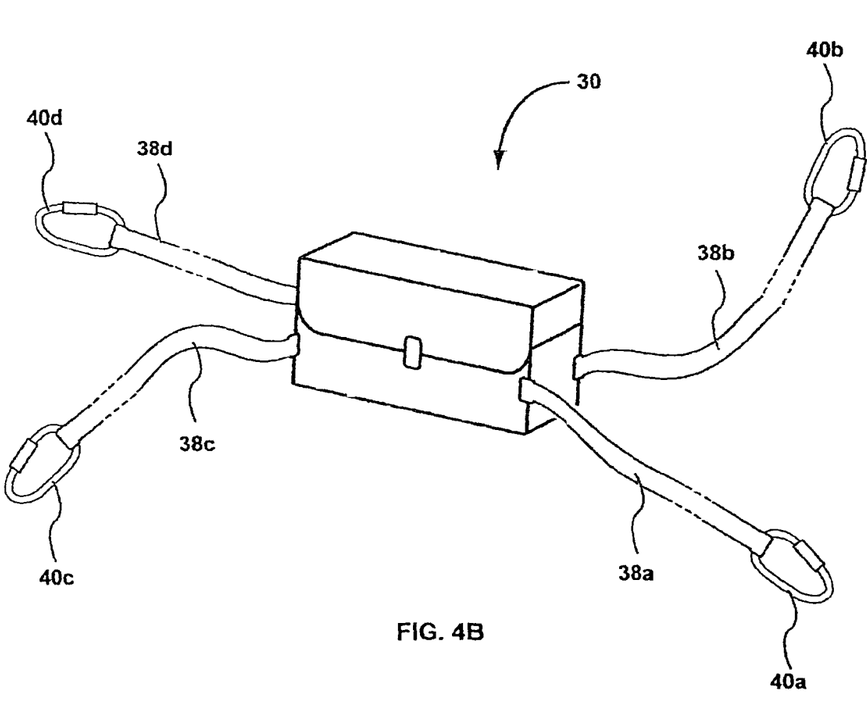

An exemplary parcel 30 for use with parcel harness 10 is illustrated in FIG. 4A. Parcel 30 includes a parcel body 32 (e.g., a satchel, hard-sided case, or the like) having a first side 34 and a second side 36. A first strap 38 extends from first side 34 and terminates in a first parcel mounting loop 40. Similarly, a second strap 42 extends from second side 36 and terminates in a second parcel mounting loop 44. First and second parcel mounting loops 40, 44 are configured to be secured about first and second parcel mounting pins 22, 24, respectively. First and second parcel mounting loops 40, 44 may be snap-link fasteners, such as carabiners (including spring-loaded carabiners and threaded latch carabiners), or simple rings. Of course, parcel 30 may include more or fewer straps (e.g., four straps 38a, 38b, 38c, 38d, one attached to each vertical edge of parcel body 32, terminating in four parcel mounting loops 40a, 40b, 40c, 40d, as shown in FIG. 4B).

Figure 5:
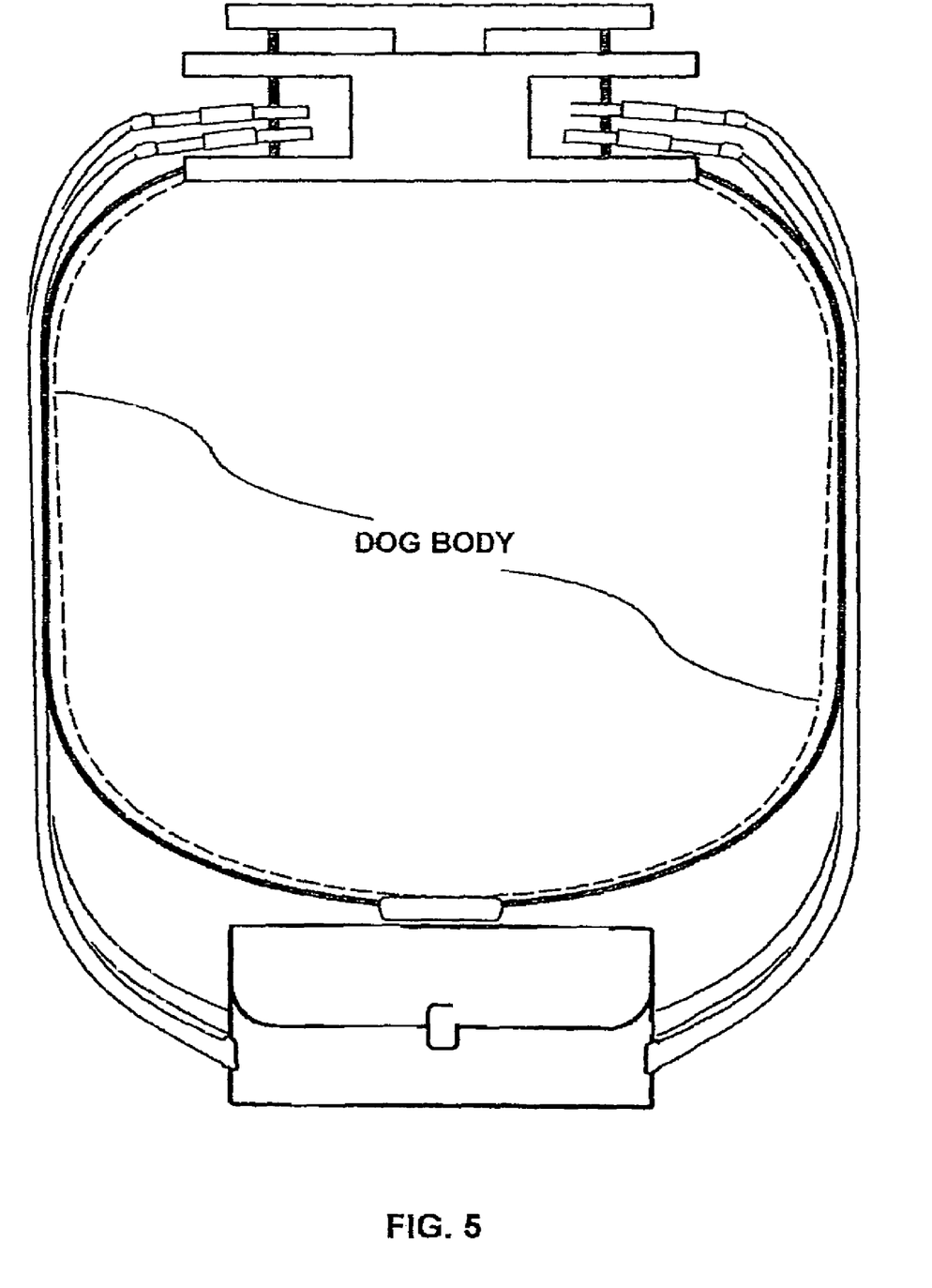
FIG. 5 illustrates a parcel attached to a parcel harness for delivery by a dog.

In use, parcel harness 10 is placed on a dog and properly adjusted for the dog, for example with the parcel mount on the dog's back. Pin bar 12 is then pushed downwards to latch the parcel mount in the closed configuration. Parcel 30 may then be attached to parcel harness 10 as shown in FIG. 5, for example by snapping first and second parcel mounting loops 40, 44 about first and second parcel mounting pins 22, 24, respectively. Of course, if first and second parcel mounting loops 40, 44 are simple rings, rather than carabiners or similar fasteners, first and second parcel mounting pins 22, 24 will be driven through first and second parcel mounting loops 40, 44 during latching of pin bar 12 to latch housing 14.

Once parcel 30 is secured to parcel harness 10, it is desirable to snugly secure parcel body 32 against the dog's chest as shown in FIG. 5. Accordingly, at least one of first strap 38 and second strap 42, and in some embodiments both first strap 38 and second strap 42, are adjustable to snug parcel body 32 against the dog's chest. Parcel body 32 is thereby substantially inhibited from moving independent of the dog and is protected from obstacles and the surrounding terrain by the dog's legs.

The dog can then be deployed into the search-and-rescue environment to locate a casualty. Once the dog has located the casualty, the latch release signal can be generated (e.g., by depressing an appropriate button on the handler's remote transmitter and/or by detecting the dog's sustained barking with a microphone). The latch release signal causes the latch release mechanism to actuate, thereby releasing pin bar 12 from lower shell 14 and returning the parcel mount to the open configuration as shown in FIG. 6.

Figure 6:
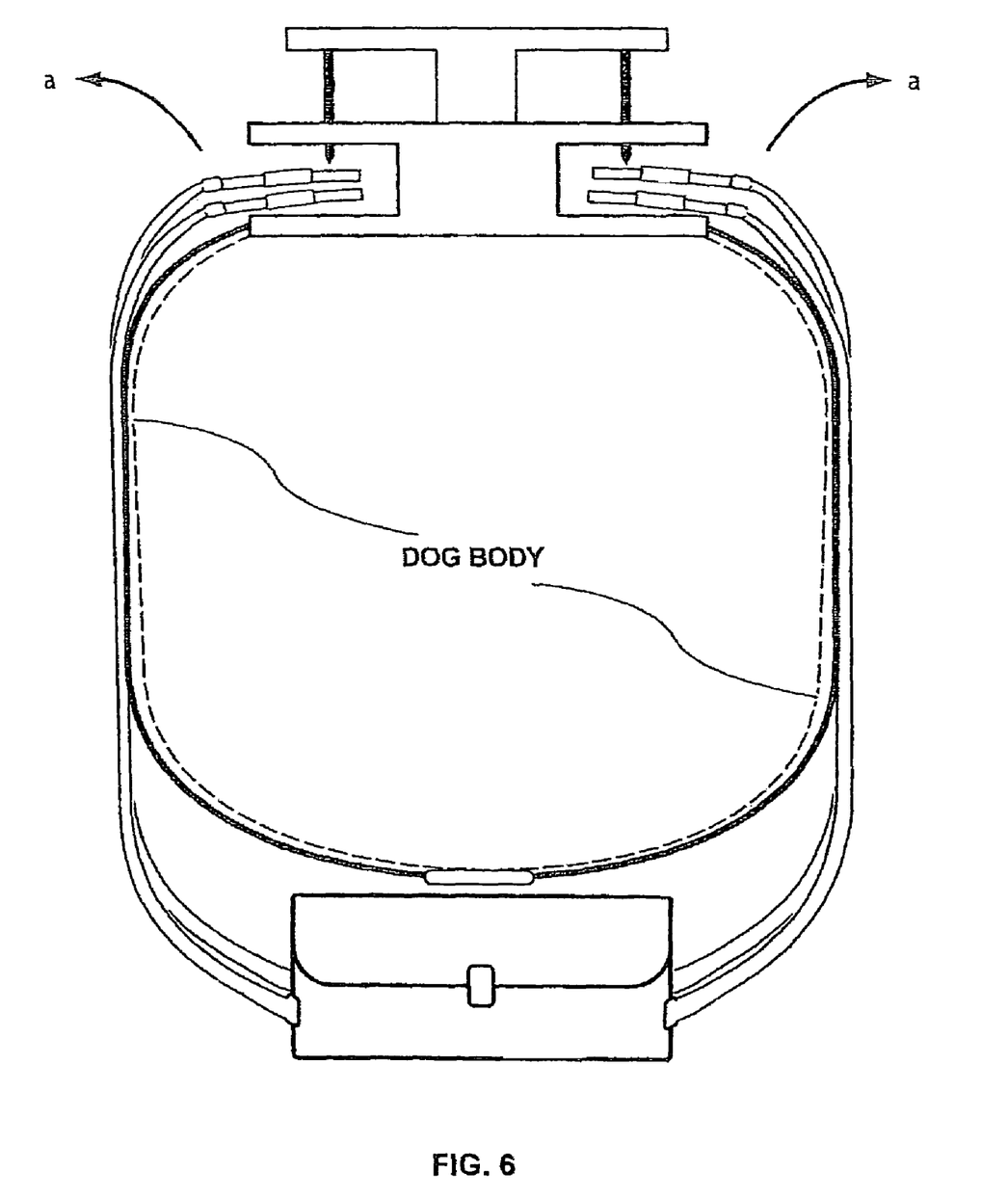
FIG. 6 illustrates a parcel being deployed.

As FIG. 6 illustrates, once the parcel mount returns to the open configuration, first and second parcel mounting loops 40, 44 are no longer restrained by first and second parcel mounting pins 22, 24, and instead are free to fall away from the dog's body (arrows "a"). This will occur by virtue of the weight of parcel body 32. Parcel body 32 will accordingly be smoothly released from the dog's underside and advantageously deposited accurately where the dog is standing. Parcel harness 10 remains attached to the dog, such that, when the dog returns to its handler, the process can be simply and efficiently repeated with a new parcel.

Figure 7:
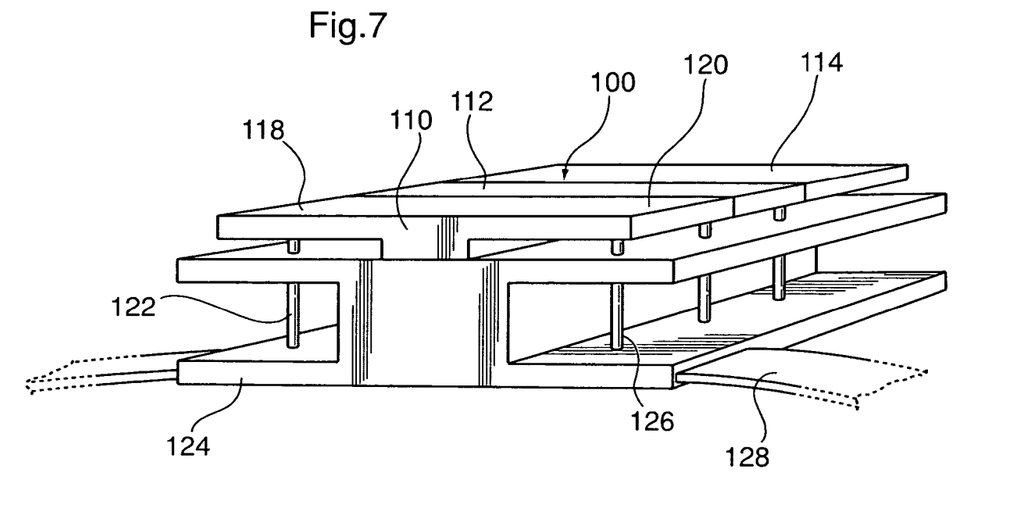
FIG. 7 illustrates a parcel harness according to an alternate embodiment configured to deploy a plurality of parcels.

In the various embodiments described thus far, parcel harness 10 generally includes a single pin bar 12 configured with first and second mounting pins to carry a parcel. Shown in FIG. 7 is an alternate embodiment of the parcel harness which employs a plurality of independently operated pin bars to retain and selectively deploy one or more of a plurality of parcels. As shown, the parcel harness 100 comprises a first pin bar 110, a second pin bar 112, and a third pin bar 114. The actual number of pin bars may vary from that illustrated (e.g. 2 pin bars, 4 pin bars, etc. . . . ), as the selection of three pin bars is merely for illustrative purposes. Each of pin bars 110, 112, 114 are configured similar to that described above with respect to the embodiment shown in FIG. 1. For example, with respect to pin bar 110, pin bar 100 has a first end 118 and a second end 120, which is generally opposite first end 118. A first mounting pin 122 extends from first end 118 towards the latch housing 124, while a second mounting pin 126 extends from second end 120 towards latch housing 124. As will be appreciated, pin bars 112, 114 are similarly configured. In this configuration, the parcel harness 100 provides a spring-loaded latch and latch release mechanism for each pin bar 110, 112, 114. Each of the latch release mechanisms are operably coupled to the latch release processor, configured to enable selective actuation of a selected latch release mechanism. The parcel harness 100 is also provided with a suitable harness 128 to permit the parcel harness 100 to be secured about a dog. With the ability to mount a plurality of parcels to the dog, the dog's handler has the option of releasing a selected parcel at a particular site. For example, the parcel harness 100 may be fitted with three independent parcels, each comprising an emergency blanket and locating beacon. On locating a casualty, a selective latch release signal is received by the processor, either from the wireless transmitter through the wireless receiver or from the microphone, resulting in the deployment of one of the parcels. In this embodiment, the wireless transmitter may be configured with the ability to send three distinct latch release signals, each corresponding to one of the parcels mounted on the parcel harness. Following parcel deployment, the dog is then able to resume search-and-rescue for further casualties.

In a still further alternate arrangement, instead of the wireless transmitter and processor being configured to operate on the basis of selective signals, each is configured to operate on the basis of single latch release signal, wherein a first parcel is deployed on receipt of a first signal, a second parcel is deployed on receipt of a second signal, until all parcels are deployed.

Figure 8:
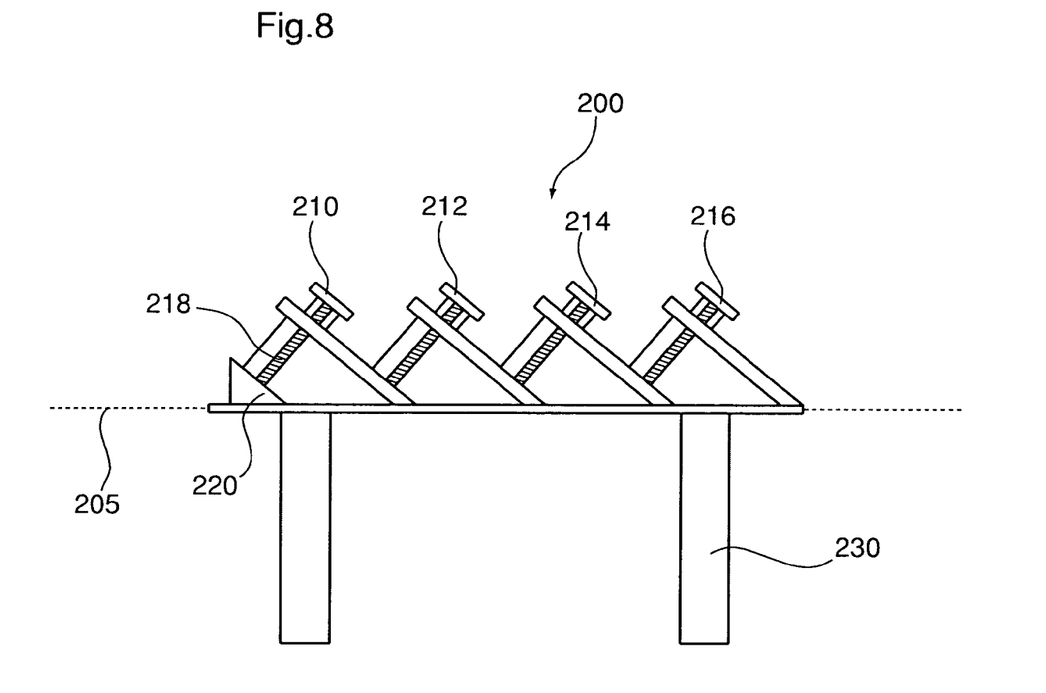
FIG. 8 illustrates a parcel harness according to a further embodiment wherein the mechanism is positioned at an angle.

Shown in FIG. 8 is yet another embodiment which provides a parcel harness 200 configured with four pin bars, wherein the overall mechanism has been oriented at an angle relative to the horizontal plane 205. As shown, each of pin bars 210, 212, 214, 216 are oriented such that the corresponding mounting pins are situated at a generally 45° relative to horizontal plane 205. For example, pin bar 210 provides a first mounting pin 218 and a second mounting pin (not shown) which extend to the latch housing 220, in much the same manner as described above. As with the previous embodiments, the parcel harness 200 is configured with a suitable harness 230 to permit the parcel harness 200 to be secured about a dog. While shown at a generally 45° angle, the overall mechanism may be oriented such that the mounting pins are arranged at an intermediate angle between a generally vertical orientation, and a generally horizontal orientation.

Figure 9:
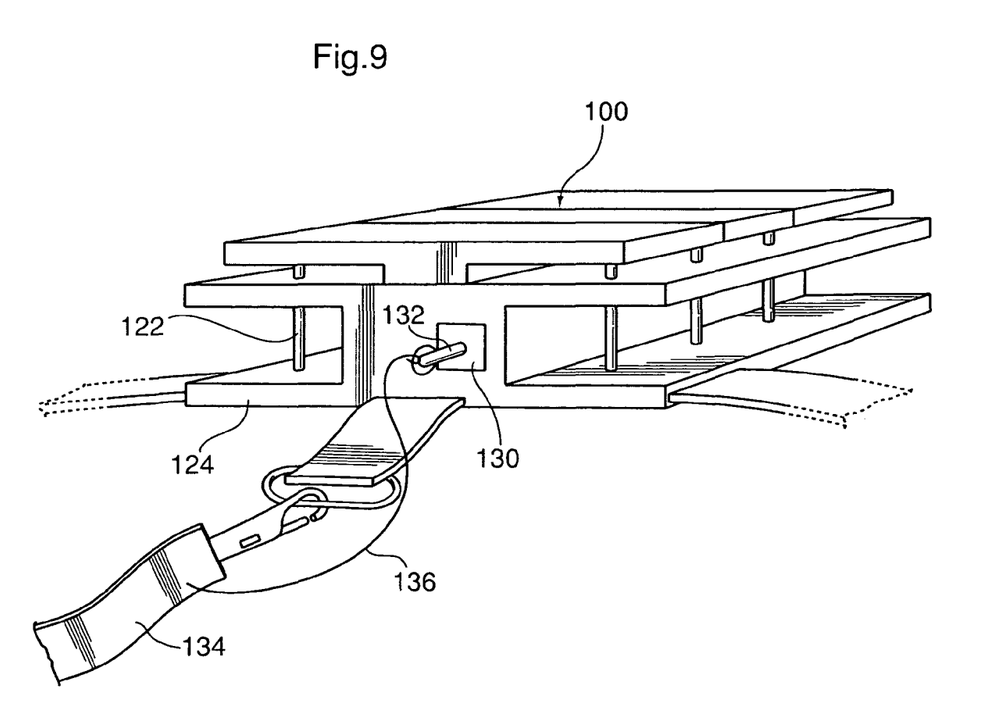
FIG. 9 illustrates the parcel harness according to FIG. 7 further comprising a pin switch to activate the parcel harness upon detachment of a leash.

To facilitate use in the field, the parcel harness may be configured with an automatic on-off switch that operates on the basis of attachment/detachment of the dog handler's leash from the parcel harness. For illustrative purpose, using the embodiment comprising three pin bars, FIG. 9 shows parcel harness 100 configured with a pin switch 130. In use, the removal of a cooperating pin 132 from switch 130 activates parcel harness 100. As shown, pin switch 130 is provided on latch housing 124 and is operably coupled to the processor to control its activation. The cooperating pin 132 is operably connected to the handler's leash 134 by way of a tether 136, wherein upon detachment of leash 134 from parcel harness 100, tether 136 displaces pin 132 from switch 130, thereby activating the parcel harness 100.

Alternatively, in some embodiments, the switch may comprise a proximity switch that activates the parcel harness once the dog goes beyond a certain distance from the handler. Exemplary types of proximity switches include, without limitation, radio-frequency, acoustic, inductive, and capacitive proximity switches. It will be appreciated that other on-off switch mechanisms are known in the art, and can be employed for automating the activation of the parcel harness upon release of the dog from the handler's leash.

In a further embodiment, the pin bar is intended as a single use component that is completely released/ejected from the parcel harness upon deployment of the parcel. In this way, the disengaged pin bar does not present a hazard to the dog insofar as getting caught on debris or other obstacles while navigating through a search area. As a single use component, the pin bar is provided as a disposable element that is attached to the parcel harness during preparation of the parcel harness for use. In operation, the single use pin bar operates in much the same way as the integrated pin bar previously described, except for the fact that the pin bar is ejected upon deployment of the parcel.

Although several embodiments have been described above with a certain degree of particularity, those skilled in the art could make numerous alterations to the disclosed embodiments.

For example, although described as having a single parcel mounting pin on either side of the parcel mount, it is contemplated that multiple parcel mounting pins may be utilized (e.g., two parcel mounting pins on either side of the parcel mount), for example to more comfortably distribute the weight of heavier parcels. Likewise, more than one strap may be attached to each parcel mounting pin (e.g., two vertical edge straps attached to each parcel mounting pin).

As another example, although described with the latch housing secured to the dog and the pin bar movable relative thereto, it is contemplated to "invert" the arrangement described and illustrated (that is, to secure the pin bar to the dog and have the latch housing movable relative thereto).

As still another example, although described in a search and rescue context, also contemplated is the ability to use the parcel harness to remotely deploy a parcel in non-search and rescue contexts, for example to deploy a remote monitoring system or the like.

Although the various embodiments described above make reference to a wireless communication to transmit the latch release signal, the parcel harness can alternatively be configured for wired communication where a cable remains attached to the harness and is released as the dog traverses the search area. Different types of cables can be effectively used in this embodiment, for example, and without limitation, a fiber optic cable.

While generally described as having the parcel(s) secured in the location of the dog's chest, the parcel can be configured for attachment wherein the parcel is located at an alternate location, such as on the side of the dog's torso. This configuration is particularly well suited for a situation where the parcel harness is configured to deploy a plurality of parcels, as placement along the side of the dog's torso may permit a larger quantity of parcels to be carried.

While the latch housing portion the parcel harness is generally shown as being mounted on the dog's back, it is contemplated that the latch housing may be positioned at other locations, such as on the dog's chest. The placement of the latch housing on the dog's back in not intended to be a limiting factor as placement of the latch housing at alternate locations may present unique advantageous in certain situations.

While the harness for securing the parcel harness to a dog is shown using one or two straps, the configuration of the harness may take on a variety of configurations such as a single strap, a double strap or a plurality of straps comprising three or more straps.

While described with respect to applications using a dog as the delivery animal, other animals are contemplated, including but not limited to horses, pigs, cats and rats.

All directional references (e.g., upper, lower, upward, downward, left, right, leftward, rightward, top, bottom, above, below, vertical, horizontal, clockwise, and counterclockwise) are only used for identification purposes to aid the reader's understanding, and do not create limitations, particularly as to the position, orientation, or use. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit and scope as defined in the appended claims.

What is claimed is:

1. An apparatus for securing at least one parcel to a dog's chest, the apparatus comprising:
    a latch housing;
    at least one pin bar having a first end and a second end and including a first mounting pin extending from the first end towards the latch housing and a second parcel mounting pin extending from the second end towards the latch housing;
    a spring-loaded latch to releasably secure the at least one pin bar to the latch housing in a closed configuration, wherein the spring-loaded latch is biased towards an open configuration; and
    a latch release mechanism.

2. The apparatus according to claim 1, further comprising a harness attached to at least one of the latch housing and the pin bar, wherein the harness is configured to permit the apparatus to be secured about a dog.

3. The apparatus according to claim 1, further comprising a latch release processor operably coupled to the latch release mechanism and configured to actuate the latch release mechanism upon receipt of a latch release signal.

4. The apparatus according to claim 3, further comprising a wireless receiver operably coupled to the latch release processor and configured to receive the latch release signal from a wireless transmitter.

5. The apparatus according to claim 3, further comprising a microphone operably coupled to the latch release processor and configured to receive an audible latch release signal.

6. The apparatus according to claim 5, wherein the audible latch release signal is sustained barking.

7. The apparatus according to claim 5, wherein the microphone operates in a failover mode.

8. The apparatus according to claim 1, further comprising at least one signal light attached to at least one of the pin bar and the latch housing.

9. The apparatus according to claim 8, wherein the at least one signal light comprises a first signal light attached to a left side of at least one of the pin bar and the latch housing and a second signal light attached to a right side of at least one of the pin bar and the latch housing.

10. The apparatus according to claim 1, further comprising a parcel comprising:
  a parcel body having a first side and a second side;
  a first strap extending from the first side of the parcel body and terminating in a first mounting loop; and
  a second strap extending from the second side of the parcel body and terminating in a second mounting loop,
  wherein the first and second mounting loops are configured to be secured about the first and second parcel mounting pins, respectively.

11. A system permitting a dog to carry a parcel securely against its chest, the system comprising:
  a parcel harness configured to wrap around a dog's torso and including a parcel mount, the parcel mount comprising:
  at least one pin bar having a first end and a second end and including a first parcel mounting pin extending from the first end and a second parcel mounting pin extending from the second end;
  a latch housing;
  a latch to releasably secure the at least one pin bar to the latch housing in a closed configuration, wherein the first and second parcel mounting pins are positioned adjacent the latch housing;
  a spring connected to the at least one pin bar and the latch housing, wherein the spring biases the at least one pin bar and the latch housing in an open configuration, wherein the first and second parcel mounting pins are spaced apart from the latch housing;
  a latch release mechanism; and
  a latch release processor operably coupled to the latch release mechanism and configured to actuate the latch release mechanism upon receipt of a latch release signal; and
  a parcel, comprising:
    a parcel body having a first side and a second side;
    a first strap extending from the first side of the parcel body and terminating in a first parcel mounting loop, wherein the first parcel mounting loop is configured to be secured about the first parcel mounting pin; and
    a second strap extending from the second side of the parcel body and terminating in a second parcel mounting loop, wherein the second parcel mounting loop is configured to be secured about the second parcel mounting pin.

12. The system according to claim 11, further comprising a wireless transmitter configured to send the latch release signal, and wherein the parcel mount further comprises a wireless receiver operably coupled to the latch release processor and configured to receive the latch release signal sent by the wireless transmitter.

13. The system according to claim 12, wherein the parcel mount further comprises a microphone operably coupled to the latch release processor and configured to receive an audible latch release signal.

14. The system according to claim 13, wherein the microphone operates to receive the audible latch release signal only when communication between the wireless transmitter and the wireless receiver is impossible.

15. The system according to claim 13, wherein the microphone operates to receive the audible latch release signal only when signal integrity between the wireless transmitter and the wireless receiver drops below a preset threshold.

16. The system according to claim 11, wherein a length of at least one of the first strap and the second strap is adjustable to permit the parcel body to be snugly secured against the dog's torso.

17. The system according to claim 16, wherein a length of each of the first strap and the second strap is adjustable to permit the parcel body to be snugly secured against the dog's chest.

18. The system according to claim 11, wherein each of the first parcel mounting loop and the second parcel mounting loop comprises a carabiner.

19. A method of enabling a dog to deliver a parcel, the method comprising:
  providing a parcel harness configured to wrap around a dog's torso and including a parcel mount, the parcel mount comprising:
    at least one pin bar having a first end and a second end and including a first parcel mounting pin extending from the first end and a second parcel mounting pin extending from the second end;
    a latch housing;
    a spring-loaded latch to releasably secure the at least one pin bar to the latch housing in a closed configuration, wherein the first and second parcel mounting pins are positioned adjacent the latch housing,
    a spring force of the spring-loaded latch biasing the at least one pin bar and the latch housing towards an open configuration, wherein the first and second parcel mounting pins are spaced apart from the latch housing; and
    a latch release mechanism;
  attaching the parcel harness to a dog such that the parcel mount is located on the dog's back;
  latching the at least one pin bar to the latch housing in the closed configuration;
  providing a parcel having a parcel body, a first strap terminating in a first parcel mounting loop extending from a first side of the parcel body, and a second strap terminating in a second parcel mounting loop extending from a second side of the parcel body; and
  attaching the first parcel mounting loop to the first parcel mounting pin and the second parcel mounting loop to the second parcel mounting pin such that the parcel body is located under the dog's torso.

20. The method according to claim 19, further comprising adjusting the parcel such that the parcel body is snugly secured against the dog's chest.

21. The method according to claim 19, further comprising transmitting a remote signal to actuate the latch release mechanism, thereby releasing the pin bar and the latch housing into the open configuration and dropping the parcel from under the dog's torso.

22. The method according to claim 19, further comprising locally receiving a signal to actuate the latch release mechanism, thereby releasing the pin bar and the latch housing into the open configuration and dropping the parcel from under the dog's torso.

* * * * *